Dec. 11, 1962   F. BLOCH ETAL   3,068,399
GYROMAGNETIC RESONANCE METHOD AND APPARATUS
Filed Sept. 7, 1954
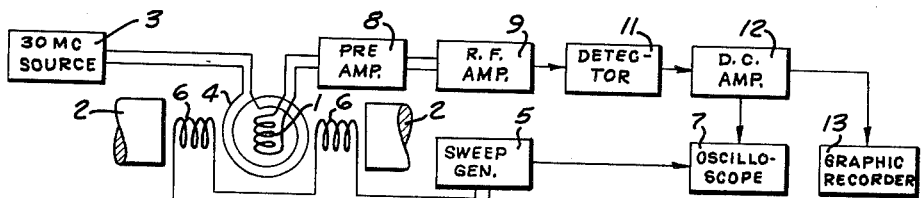
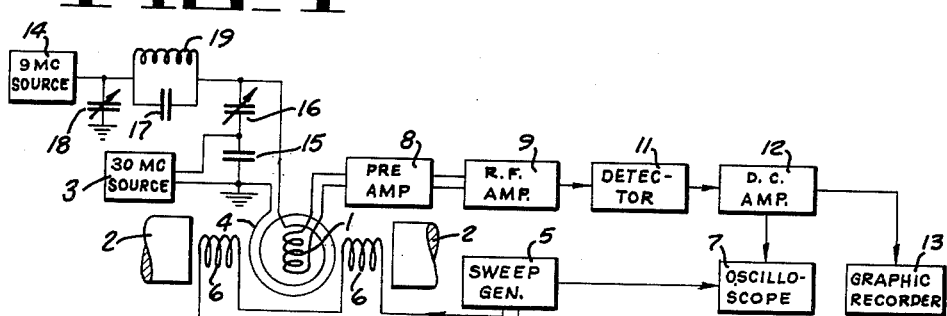
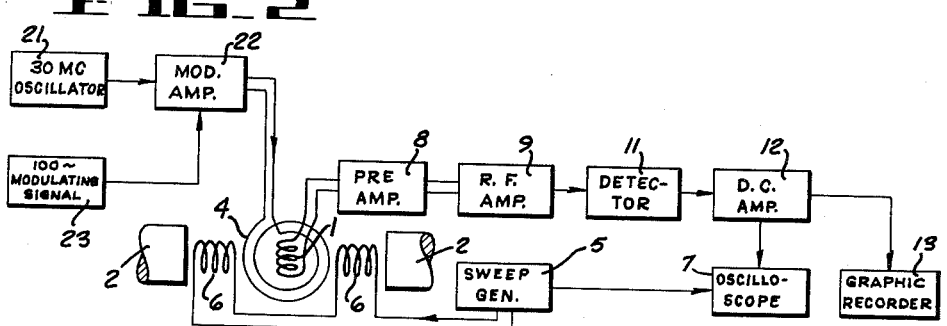
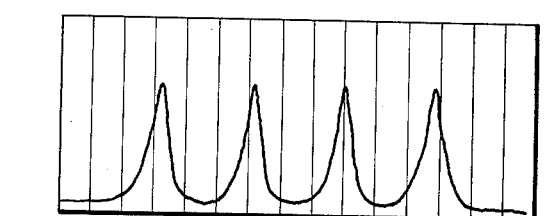
Felix Bloch
Martin E. Packard &
James N. Shoolery
INVENTORS
BY Paul B. Hunter
ATTORNEY 3,068,399
GYROMAGNETIC RESONANCE METHOD
AND APPARATUS
Felix Bloch, Palo Alto, Martin E. Packard, Menlo Park, and James N. Shoolery, Palo Alto, Calif.; said Packard and said Shoolery assignors to Varian Associates, San Carlos, Calif., a corporation of California
Filed Sept. 7, 1954, Ser. No. 454,272
10 Claims. (Cl. 324—0.5)

This invention relates in general to the field of gyromagnetic resonance and, more particularly, to novel methods and apparatus for disturbing the spin-spin coupling interaction between certain gyromagnetic atom portions of interest and the magnetic moments of other neighboring atom portions which normally affect the uniform precession of those atom portions of interest. This invention will be explained and described with reference to a nuclear resonance spectrometer system but it should be understood that this invention is broadly applicable to atomic quantum systems in general including those involving atom portions other than nuclei, for example, electrons.

Nuclei which possess the properties of magnetic moment and gyroscopic moment will precess in a polarizing or aligning magnetic field and, when a driving radio frequency magnetic field, which is of the Larmor precession frequency of the particular nuclei in the polarizing field, is applied to the nuclei at an angle to the polarizing field, preferably normal, they will change the orientation of their moment with respect to the polarizing field. This principle of gyromagnetic resonance has been set forth in U.S. Patent 2,561,489, issued to Felix Bloch and William W. Hansen on July 24, 1951, entitled "Method and Means for Chemical Analysis by Nuclear Inductions," wherein apparatus including a pickup coil positioned near the precessing nuclei was utilized to detect the change of orientation of the atom portions by the voltages induced in the pickup coil due to the precessing magnetic moments.

There are many instances when the nuclei under investigation, which will hereafter be referred to generally as the principal nuclei or group of nuclei, are in the presence of other nuclei, which will hereafter be referred to generally as the secondary nuclei or group of nuclei. The different groups of nuclei may be different species of nucleus or may be nuclei of the same species with resonance frequencies separated by a chemical shift. Their respective values of Larmor frequency in the same polarizing magnetic field strength will therefore be different. Thus, while the orientation of the moments of the principal nuclei is changing with respect to the polarizing field while precessing at the Larmor frequency in resonance with the applied radio frequency field, the secondary nuclei are also polarized but do not undergo a resonant reorientation of their moments or, as described in another way, resonant transitions between energy levels, in this particular field strength since the frequency of the applied R.F. field is not equal to the value of their Larmor frequency.

There exists a coupling between the magnetic moments of the principal nuclei and of the secondary nuclei. This interaction is the magnetic interaction between each nucleus and the electron spin of its own atom together with the exchange coupling of the electron spins with each other and is commonly designated $I_1 \cdot I_2$ interaction where $I_1$ is the spin of the principle nuclei and $I_2$ is the spin of the secondary nuclei. For a more detailed explanation of this interaction between the principal and secondary nuclei see the letter to the editor by Ramsey and Purcell in the Physical Review, vol. 85, page 143, January 1, 1952.

The result of this interaction is the splitting of the nuclear resonance line of the principal nuclei into a doublet or multiplet, i.e., the resonance curve has two or more separated resonance peaks rather than the one resonance peak received from the same species of nuclei when examined free from the interaction of any secondary nuclei. A more extensive discussion of doublet and multiplet resonances in various chemical compounds is found in an article by Gutowsky, McCall, and Slichter entitled "Nuclear Magnetic Resonance Multiplets in Liquids" in the Journal of Chemical Physics, vol. 21, page 279, February 1953.

Much useful structural information can be obtained from the interpretation of the spin-spin doublet and multiplet resonances and additional useful information, such as the assignment of particular lines in the observed spectrum to the related nuclei having a unique position in the molecule, may be gained from eliminating or otherwise changing the effect of the spin-spin interaction between different nuclei.

The object of the present invention is to provide a novel method and apparatus for disturbing the effect of spin-spin interaction between atom portions of a first and second group of atom portions so that, for example, spin-spin doublet and multiplet resonance lines may be changed into a different number of lines. Such lines may be reduced or blended into a fewer number of resonance lines or peaks or in some cases the lines may be increased in number.

One feature of the present invention is the application of a radio frequency field to the atom portions at the frequency of the energy level transitions of the atom portions of said second group during resonance transitions of the atom portions of said first group whereby the spin orientations of the atom portions of the second group are disturbed sufficiently to effectively disrupt the spin-spin coupling between the atom portions of the first and second groups.

Another feature of the present invention is the provision of a gyromagnetic resonance spectrometer for investigating a substance containing atom portions of a first group of atom portions to which atom portions of a second group are spin-spin coupled wherein a first radio frequency magnetic field is applied to the aligned atom portions of the first group to produce resonance transitions of these atom portions between energy levels, the resonance condition of said first group being subsequently detected, and a second radio frequency magnetic field is applied to the atom portions of the second group to produce transitions of the second group between energy levels to effectively destroy the spin-spin coupling between the atom portions of the first and second groups.

Another feature of the present invention is the provision, in gyromagnetic resonance systems of the above featured types, of a transmitter section which contains first and second stable R.F. frequency sources for providing the two R.F. fields to the matter under investigation.

Still another feature of the present invention is the provision, in one embodiment, of a source of modulating frequency for modulating the transmitter radio frequency field or the polarizing field whereby the original R.F. frequency and one or more of the side band frequencies produced may be utilized for energizing the principal and secondary atom portions, for example nuclei, at their respective Larmor frequencies.

These and other features and advantages of the present invention will become apparent upon perusal of the following specification taken in connection with the accompanying drawings wherein FIG. 1 shows in block diagram form a known type of high resolution nuclear resonance system, FIG. 2 shows in block diagram a novel high resolution nuclear resonance system which embodies the present invention, FIG. 3 shows another high resolution nuclear resonance system which may be utilized in working the present invention, FIG. 4 is an oscilloscope trace of a typical proton (the principal nuclei) multiplet resonance signal obtained from the chemical compound NaBH$_4$ (sodium borohydride) in D$_2$O (deuterium oxide) when investigated by the system of FIG. 1 where the driving radio frequency field is of the Larmor frequency of the protons or hydrogen nuclei only, and, FIG. 5 is an oscilloscope trace of the proton resonance in the same sample of NaBH$_4$ in D$_2$O when utilizing the system of FIG. 2 where the boron (secondary) nuclei are energized by a second radio frequency driving field of the Larmor frequency of the boron nuclei.

Similar characters of reference are used in the above figures to designate corresponding elements.

Referring now to FIG. 1 there is shown in block diagram form one gyromagnetic resonance system of a known type which is of the high resolution spectrometer class which operates at a fixed and highly stable frequency of, for example, approximately 30 mc. and is particularly applicable for studies of narrow lines, chemical shifts and fine structures in nuclear resonances. The matter which the system is investigating is placed in a suitable test tube (not shown) which is then inserted within the receiver coil 1 in the probe. The probe is positioned within the unidirectional field between the pole faces of the magnet 2. A suitable radio frequency source 3 provides the radio frequency energy to the transmitter coil 4 within the probe at the Larmor frequency of the nuclei under investigation. This radio frequency energy in the transmitter coil produces an alternating field perpendicular to the polarizing unidirectional field to thereby cause the nuclei to change their orientation in the polarizing field. The sweep generator 5 provides a low frequency voltage to the sweep coils 6 in the probe which modulates the polarizing magnetic field to cause the region of resonance of the nuclei to be repeatedly swept through. The sweep generator is tunable over a range of sweep frequencies, for example, 0.1 to 30 cycles per sec. This low frequency signal is also transmitted to the horizontal deflection plates of an oscilloscope 7 to synchronize the oscilloscope with the modulated polarizing field. The alternating field produced by the precessing nuclei induces a voltage in the receiver coil 1. This energy induced in the receiver coil is transmitted to a preamplifier 8, and R.F. amplifier 9 and then to a detector circuit 11 where the high frequency energy is demodulated to give an envelope signal. This signal is transmited to a D.C. and low audio amplifier 12 where it is amplified and is then transmitted to the horizontal plates of the oscilloscope 7. A graphic recorder 13 is also shown provided in this system to give a permanent recording in graphic form of the amplitude of the induced energy in the receiver coil.

FIG. 4 shows the proton resonance signal which is obtained from NaBH$_4$ in D$_2$O (sodium borohydride in deuterium oxide) under investigation by the high resolution system of FIG. 1. In this case the spin-spin interaction between the multiplet structure of the resonance line is clearly shown, there being four pronounced peaks symmetrically arranged about the resonance or central frequency of the proton due to the B$^{11}$. The strength of the polarizing field was 7050 gauss and was varied over a range of about 100 milligauss to display the spectrum. The mean (or average) Larmor frequency of the protons was 30.0013 megacycles.

Referring to FIG. 2 there is shown a high resolution nuclear resonance system which embodies the present invention, this system being similar to the system shown in FIG. 1 with the exception that a second stable source 14 of radio frequency has been added in the transmitter section. The 30 mc. source 3 is coupled to a tuned circuit which includes the transmitter coil in the probe and condensers 15 and 16, this circuit being tuned to 30 megacycles. The source 14 of approximately 9 mc. is coupled to a 9 mc. tuned circuit which comprises the transmitter coil 4, condensers 15, 16, 17 and 18 and inductor 19. Thus both a 30 mc. and 9 mc. signal pass through the transmitter coil 4.

The secondary source 14 is actually 9.6257 mc. since this is the Larmor frequency of the boron nuclei of the NaBH$_4$ in D$_2$O compound used as an example in explaining this invention. The term "Larmor frequency" means frequencies at or very near the Larmor frequency. The secondary source 14 supplies approximately 4 to 5 watts of R.F. power to the boron nuclei, the 30 mc. source 3 supplying a few milliwatts of power. Thus the boron nuclei are energized by the 9 mc. alternating magnetic field of approximately one gauss to disrupt the effects of the spin-spin coupling. The pickup or receiver coil circuit is tuned to only the resonance frequency of the principal nuclei or protons.

To briefly explain the spin-spin coupling and the manner in which it may be disturbed, the polarized boron nuclei are each oriented in one of four directions at different angles with the polarizing field, forming four groups of boron nuclei each having nearly the same number of nuclei. The magnetic moments of each particular group of boron nuclei produce a modifying effect, depending on the orientation of the boron nuclei in the particular group, on the polarizing field seen by those protons coupled to the boron nuclei of the particuar group which is different than the effect produced by the magnetic moments of any of the other groups of boron nuclei on the polarizing field as seen by the protons coupled to the boron nuclei in said other group. Therefore the protons in different molecules see different magnetic fields and thus the Larmor frequencies of the four groups of protons are separated. Now, by applying an alternating magnetic field of sufficient amplitude to the boron nuclei at their Larmor frequency, these boron nuclei rapidly change from polarization in one direction to that in another direction, i.e., rapid transitions between the different Zeeman levels are produced. The protons then see a magnetic field due to the magnetic moments of the boron nuclei which averages out to zero and therefore all the protons see a polarizing field of equal value.

The condition for complete collapse (as shown in FIG. 5) must be satisfied that the number of changes in nuclear orientations of the boron nuclei, i.e., the number of transitions per second, must be large compared to the number of cycles separating the lines in the resonance spectra. This requires a relatively strong R.F. field H$_1$ of a value which is approximately given by the relationship $$\gamma H_1 \gg \Delta\omega$$

where $\Delta\omega$ is the separation in radians per second of the doublet or multiplet lines and $\gamma$ is the gyromagnetic ratio of the boron nucleus.

FIG. 5 shows the proton resonance line which is obtained from NaBH$_4$ in D$_2$O under investigation by the novel high resolution system of FIG. 2. The boron nuclei have been energized by the signal from the secondary source 14 and the spin-spin coupling has been effectively destroyed, the proton resonance appearing as a single resonance peak.

This reduction to a single resonance peak from the multiplet resonance spectrum in many cases simplifies the interpretation of the nuclear resonance spectrum by removing overlapping peaks. If the power of the energizing signal for the secondary nuclei is such that $\gamma H_1 < \Delta\omega$, an increased number of lines will result rather than a decrease in the number as was the case described above. This disturbance may be sufficient to indicate the position of secondary nuclei in the molecule without completely reducing the spectrum to the least number of lines. One may begin to observe the effect of the energizing signal applied to the secondary nuclei if the field $H_1$ satisfies the condition $$\gamma H_1 = \frac{1}{T_2}$$

where $T_2$ is the spin-spin relaxation time of the principal group of nuclei and $$\frac{1}{T_2}$$

is the time width of the resonance lines of the principal group of nuclei. If $H_1$ is still smaller, any additional lines produced by the field $H_1$ will be obscured by the line width of the resonances of the first nuclei.

As stated above, this invention is applicable not only to spin-spin interaction between nuclei of different species but also to nuclei of the same species with resonance frequencies separated by a chemical shift. There is shown in FIG. 3 another embodiment of the present invention which may be utilized in this latter case. Assume for purposes of illustration that the resonance frequency of the nuclei under investigation is 30 mc. plus 100 c.p.s., and that the resonance frequency of the secondary nuclei is 30 mc., the resonance frequency separation being 100 c.p.s. The output of the 30 mc. oscillator 21 is transmitted to a modulated amplifier 22 which also receives a 100 c.p.s. modulating signal from a suitable source 23. The output from the modulated amplifier 22 is a strong center frequency of 30 mc. and two weaker side band frequencies of 30 mc.±100 c.p.s. The 30 mc. signal destroys the spin-spin coupling and the 30 mc. plus 100 c.p.s. signal produces the desired resonance of the nuclei under investigation. Another method that may be used is to modulate the D.C. polarizing magnetic field with the 100 cycle signal to effectively produce the desired energizing side band frequency. One example of a sample which may be treated in this manner is dichloroacetaldehyde in which the protons are separated by 100 cycles per second as discussed in Hahn and Maxwell, Physical Review, vol. 88, page 1070 (1952); see, for example page 1074, col. 2.

This invention has been described with reference to a crossed coil gyromagnetic resonance system wherein both the resonance R.F. signal and the energizing R.F. signal for the secondary nuclei are transmitted to a single transmitter coil and a separate receiver coil is utilized for detecting the resonance signal. It should be understood that a separate or third coil could be utilized for applying the energizing signal for the secondary nuclei to the sample of matter. Also a single coil system could be utilized in which one coil could serve the triple purpose of supplying both the resonance signal and the enerigizing signal for the secondary nuclei signal to the sample of matter and also for detecting the resonance signal of the nuclei under investigation. Or, as in the case where the D.C. polarizing field is modulated as mentioned above, there needs to be no changes made in the transmitter section of the known system such as that shown in FIG. 1.

It is known that another form of double resonance experiment was proposed by A. Overhauser in an article entitled "Polarization of Nuclei in Metals" in the Physical Review, vol. 91 (1953), page 476 and in the Physical Review, vol. 92 (1953), page 411. Later experimenters erformed this double resonance technique, for example, see "Polarization of Nuclear Spins in Metals," by Carver and Slichter, Physical Review, vol. 92 (1953), page 212. These Overhauser double resonance experiments were directed to the enhancement of the polarization or alignment of nuclear spins in metals or other paramagnetic substances by the method of saturating the spin resonance of the conduction or unpaired electrons in the substance. The required form of coupling between the nuclear spins and the unpaired electron spins was a time dependent spin-spin interaction. This interaction is responsible for bringing the nuclear spins into thermal equilibrium, i.e., it determines the nuclear relaxation time. The nuclear resonance signal amplitude is proportional to the nuclear polarization which in turn is relatively small under the normal thermal equilibrium condition. By upsetting the unpaired electron polarization by means of saturation with a strong radio frequency field at the electron resonance frequency, the thermal equilibrium of the nuclear spins is upset, resulting in an enhancement of the nuclear polarization.

In the method of the present invention, it is not the object to obtain an enhancement of polarization. The spin-spin coupling of interest in the present method, as distinguished from the spin-spin coupling in the Overhauser method, is a static spin-spin coupling responsible for the splitting of lines in the resonance spectrum of the atom portions under investigation. This static spin-spin coupling results in a modification of the total aligning field strength at the nuclear spins, causing the described multiple resonance lines, or, in other words, line splitting. Unlike the Overhauser technique, the present invention does not depend upon thermal equilibrium considerations discussed above.

Although this invention has been described with reference to one group of principal nuclei and one group of secondary nuclei it should be noted that there may be cases where it is desirable to energize two or more different groups of secondary nuclei at their respective Larmor frequencies in which case the proper number of alternating magnetic fields would be applied to the matter under investigation. Also the chemical compound $NaBH_4$ in $D_2O$ was adopted only for purposes of illustration and it is obvious that this invention is applicable to a great number of other substances. As stated above, this invention is applicable to other atom portions such as electrons as well as nuclei and it should be noted that it may be applied to unlike species of atom portions such as, for example, energizing electrons while observing a nuclear spectrum or vice versa.

Since many changes could be made in the above construction and many apparently widely different embodiments of this invention could be made without departing from the scope thereof, it is intended that all matter contained in the above description or shown in the acompanying drawings shall be interpreted as illustrative and not in a limiting sense.

What is claimed is:

1. The method for chemically analyzing a volume of matter containing a plurality of different groups of atom portions each possessing properties of magnetic moment and gyroscopic moment which comprises the steps of aligning the atom portions in the matter in a magnetic field, applying a first radio frequency magnetic field to the matter at an angle to said magnetic field and at the Larmor frequency of the atom portions in one group to produce resonance of the atom portions in said one group, the resonance spectrum of said first group being split into a plurality of lines due to the spin-spin coupling between the atom portions in said first group and another group, this spin-spin coupling modifying the total aligning field strength at the atom portions of said first group, applying a second radio frequency magnetic field to the matter at an angle to the aligning magnetic field and at the Larmor precession frequency of the atom portions of said other group, the strength of said second radio frequency field being sufficiently great to produce rapid transitions between Zeeman levels of the atom portions in the other group whereby the spin-spin coupling between the groups of atom portions is disturbed to the point where the plurality of resonance lines are affected in their position and number in the spectrum, and detecting the precession of the atom portions of said first group in the first field.

2. The method as claimed in claim 1 wherein said atom portions in said different groups are nuclei.

3. The method of disturbing the spin-spin coupling between a first group of atom portions possessing the properties of magnetic moment and gyroscopic moment in a volume of matter which atom portions are precessing at their Larmor frequency in an alignment magnetic field in response to an applied radio frequency magnetic field, and a different group of atom portions possessing the same properties which are spin-spin coupled to the first group, the resonance spectrum of said atom portions in the first group being split into a plurality of lines due to the spin-spin coupling between the atom portions in the two groups which comprises the step of applying a second radio frequency magnetic field at the Larmor frequency of the atom portions of said second group and at a sufficient strength whereby rapid transitions are produced between Zeeman levels of the atom portions of said second group to thereby disrupt the spin-spin coupling between the atoms in the two groups and thereby change the number of resonance lines in said spectrum, one of said radio frequency magnetic fields being applied from a radio frequency source and the other radio frequency magnetic field being produced by a modulation of one of said polarizing or said one radio frequency magnetic fields.

4. Apparatus for use in the chemical analysis of a sample of matter under investigation positioned in a polarizing magnetic field, the sample of matter having different groups of nuclei, each group having a different Larmor frequency in the particular polarizing magnetic field comprising a first source of radio frequency energy at the Larmor frequency of the nuclei in one of said groups, a second source of radio frequency energy at the Larmor frequency of the nuclei in the other group of nuclei and of a relatively higher power than said first radio frequency energy, a first tuned circuit including a transmitter coil coupled to the first and second source and tuned to the frequency of the first source, a second tuned circuit including the transmitter coil coupled to the first and second source and tuned to the second source, said coil being adapted to be positioned within the polarizing field to apply the two radio frequency fields to said matter at an angle to the polarizing magnetic field to produce gyromagnetic resonance of the nuclei in the said one of said groups, the resonance spectrum of the nuclei in said one group being split into a plurality of resonance lines due to the spin-spin coupling between the nuclei in the two groups, the power of said second radio frequency energy producing rapid transitions between Zeeman levels of the nuclei in said other group of nuclei to effectively disturb the spin-spin coupling between the two groups of nuclei and thereby change the number of resonance lines in said spectrum, and means for detecting the resonance precession of the nuclei in the said one of said groups in said polarizing magnetic field.

5. Apparatus for use in the chemical analysis of a sample of matter positioned in a polarizing magnetic field, the sample of matter having different groups of nuclei, each group having a different Larmor frequency in the particular polarizing magnetic field comprising a first source of radio frequency magnetic field at the Larmor frequency of the nuclei in a first one of said groups, means for modulating the radio frequency signal of said first source to produce a side band radio frequency magnetic field at the Larmor precession frequency of the nuclei in the second one of said groups, means for applying said first driving radio frequency magnetic field and said side band driving radio frequency magnetic field to the matter under investigation, one of said driving radio frequency magnetic fields producing a resonance spectrum in one of said groups of nuclei which is split into a plurality of resonance lines due to the spin-spin coupling between the nuclei in the two groups, and the other of said driving radio frequency magnetic fields being of sufficiently great strength to produce rapid transitions between Zeeman levels of the nuclei in the other of said groups to disrupt the spin-spin coupling and thereby change the number of resonance lines in said spectrum into a different number of lines, and means for detecting the resonance precession of the nuclei in said one group in the polarizing magnetic field.

6. Gyromagnetic resonance apparatus for investigating matter having therein a plurality of groups of atom portions possessing the properties of magnetic moment and gyroscopic moment, the groups being spin-spin coupled to each other, which comprises means for aligning the atom portions in a unidirectional magnetic field, a radio frequency coil coupled to the matter, a first radio frequency source coupled to said coil for producing a first radio frequency magnetic field of the Larmor frequency of said first group of atom portions for producing gyromagnetic resonance of the atom portions in said first group, the resonance spectrum thereof being split into a plurality of resonance lines due to the spin-spin coupling between the atom portions in the two groups, and a second radio frequency source coupled to said coil for producing a second radio frequency magnetic field at the Larmor frequency of said second group of atom portions and of a relatively higher power than said first r.f. magnetic field for producing rapid reorientations of the magnetic moments of the atom portions in said second group to thereby effectively disturb the spin-spin coupling between said groups of atom portions whereby the number of resonance lines in said spectrum is changed into a different number of lines.

7. The method of changing the plurality of resonance lines in a gyromagnetic resonance spectrum obtained from a first group of atom portions possessing the properties of magnetic moment and gyroscopic moment in a volume of matter located in an aligning magnetic field in which the atom portions are precessing in response to a radio frequency magnetic field applied to the matter, the plurality of resonance lines resulting due to the existence of a spin-spin coupling between the atom portions of said first group and the atom portions of a second group of atom portions which also possess the properties of magnetic moment and gyroscopic moment in the volume of matter, this spin-spin coupling modifying the total aligning field strength at the atom portions of said first group and thus producing a splitting of the resonance into the plurality of lines, which comprises the step of applying a radio frequency magnetic field to the atom portions of said different group at an angle to the aligning field and at the Larmor frequency of said different group and sufficiently strong to produce rapid transitions between Zeeman levels of the atom portions of said different group, said rapid transitions disrupting the spin-spin coupling between the groups, thus changing the number of the resonance lines of the first group of atom portions.

8. The method of changing the plurality of resonance lines in a nuclear resonance spectrum obtained from a first group of nuclei possessing the properties of magnetic moment and gyroscopic moment in a volume of matter located in an aligning magnetic field in which the nuclei are precessing in response to a radio frequency magnetic field applied to the matter, the plurality of resonance lines resulting due to the existence of a spin-spin coupling between the nuclei of said first group and the nuclei of a second group of nuclei which also possess the properties of magnetic moment and gyroscopic moment in the volume of matter, this spin-spin coupling modifying the total aligning field strength at the nuclei of said first group and thus producing a splitting of the resonance into the plurality of lines, which comprises the step of applying a radio frequency magnetic field to the nuclei of said different group at an angle to the aligning field and at the Larmor frequency of said different group and sufficiently strong to produce rapid transitions between Zeeman levels of the nuclei of said different group, said rapid transitions disrupting the spin-spin coupling between the groups, thus changing the number of the resonance lines of the first group of nuclei.

9. The method as claimed in claim 8 wherein said first group of nuclei consists of a different species of nucleus than said second group of nuclei.

10. The method as claimed in claim 9 wherein said first group of nuclei consists of the same species of nuclei as said second group, their resonance frequencies being separated by a chemical shift.

References Cited in the file of this patent

UNITED STATES PATENTS

| | | |
|---|---|---|
| Re. 23,950 | Bloch et al. | Feb. 22, 1955 |
| 2,799,823 | Shaw et al. | July 16, 1957 |

OTHER REFERENCES

Williams: Physica XVII, No. 3–4 March-April 1951, pp. 454–460.

Pound: Physical Review, vol. 79, No. 4, August 1950, pp. 685 to 703.

Pound et al.: The Review of Scientific Instruments, vol. 21, No. 3, March 1950.

Levinthal: Physical Review, vol. 78, No. 3, May 1, 1950, pages 204–213.

Smaller: Physical Review, vol. 83, No. 4, August 15, 1951, pages 812–820.

Carver et al.: Physical Review, vol. 92. No. 1, pp. 212 and 213, Oct. 1, 1953.

Bloch et al.: Physical Review, vol. 71, No. 8, page 551, Apr. 15, 1957.